June 6, 1967  JAMES E. WEBB  3,323,967
ADMINISTRATOR OF THE NATIONAL AERONAUTICS
AND SPACE ADMINISTRATION
MASKING DEVICE
Filed June 1, 1964

INVENTOR.
DONALD H. GASTON
BY
Charles C. Wells
ATTORNEYS

United States Patent Office 3,323,967
Patented June 6, 1967

3,323,967
MASKING DEVICE
James E. Webb, Administrator of the National Aeronautics and Space Administration, with respect to an invention of Donald H. Gaston, San Diego, Calif.
Filed June 1, 1964, Ser. No. 371,856
2 Claims. (Cl. 156—345)

The invention described herein was made in the performance of work under a NASA contract and is subject to the provisions of section 305 of the National Aeronautics and Space Act of 1958, Public Law 85–568 (72 Stat. 435; 42 U.S.C. 2457).

The present invention relates to devices for use in chemical milling operations wherein portions of a workpiece are to be shaped by chemical etching. More particularly the present invention relates to a masking boot to be fitted on a workpiece whereby only portions of the workpiece to be milled will be exposed to the etching solution.

Chemical milling is a process wherein portions of a workpiece are removed or shaped by exposing these portions to a chemical etching solution. In order to carry out this process it is necessary that portions of the workpiece not to be etched be protected from the etching solution. A method previously employed to protect these portions of a workpiece was to completely coat the workpiece, by either dipping or spraying, with a masking material. The masking material was then removed or trimmed to expose the areas of the workpiece which were to be milled. This method required the use of large quantities of masking materials particularly when large workpieces were to be milled. Further, in order to assure that portions of the workpiece not to be milled were protected from the etching solution, it was necessary to thoroughly check the coating of masking material for pinholes and other defects. Also, the entire layer of masking material had to be stripped from the workpiece when the milling process was completed. It is readily apparent that this previous method of masking a workpiece was a time consuming and expensive operation.

The present invention is an improvement in that it eliminates may of the time consuming and expensive masking operations necessary to prepare a workpiece for chemical milling. This is accomplished, briefly, by providing a masking boot composed entirely of flexible material such as rubber or some other suitable material. The masking boot is shaped such that the entire surface area of the workpiece is covered except for an area slightly larger than that to be milled. Edge portions of the masking boot adjacent the area of the workpiece to be milled are sealed to the workpiece and a vacuum is drawn between the masking boot and the workpiece. A small amount of masking material is applied around the sealed edges of the masking boot and this masking material is trimmed to expose only the exact area of the workpiece to be milled. Thus only relatively small quantities of masking material will be used when the present invention is employed as compared to the amount of the masking material used in the prior method discussed above. When the milling process is complete the masking and sealing materials are stripped off and the flexible masking boot is removed from the plate. The masking boot is not damaged during removal and maybe reused many times.

It is therefore, a principal object of this invention to provide a masking apparatus wherein preparatory masking operations necessary to protect a workpiece during a chemical milling operation have been considerably reduced.

An additional object of this invention is to provide a completely flexible masking boot which may be reused many times.

Other objects and advantages of the present invention will become apparent when considering the following detailed description in conjunction with the accompanying drawings wherein.

Figure 1:
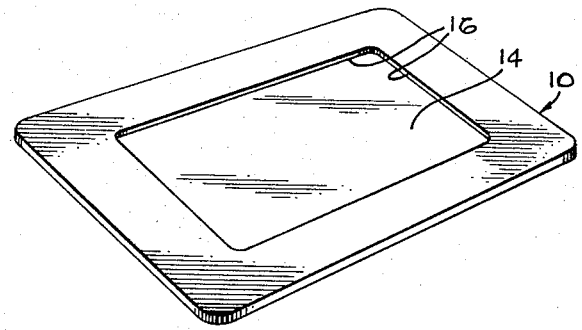
FIG. 1 is a pictorial view illustrating the flexible masking boot in a place on a workpiece.
Figure 2:
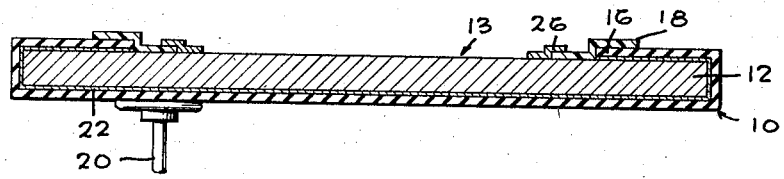
FIG. 2 is a side elevation in cross section illustrating the masking boot fitted over a workpiece with a layer of burlap disposed between the workpiece and boot.
Figure 3:
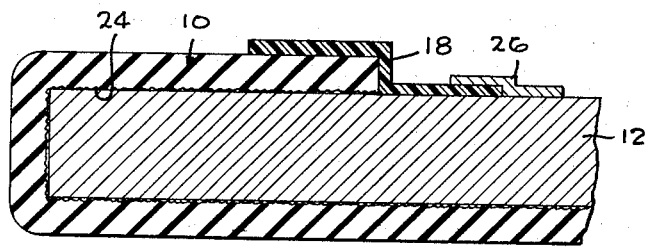
FIG. 3 is a view, partially broken away, illustrating an embodiment of the invention wherein the layer of fibrous material has been omitted and instead thereof the inner surface of the masking boot has been roughened.

Referring now to the drawings, FIG. 1 illustrates an assembly wherein a masking boot 10 has been applied to a workpiece 12. The masking boot is composed entirely of rubber or some other suitable flexible material so that it can be applied to the workpiece in a form fitting manner. The masking boot is in the form of a bag or envelope which completely encloses the workpiece except that an opening 13 in the masking boot exposes an area 14 of the workpiece which is slightly larger than the area to be milled. The opening in the masking boot is defined by a continuous edge portion 16. This continuous edge portion is sealed to the workpiece by plastic tape 18 or some other suitable sealing means. This sealing of the masking boot is necessary so that a vacuum can be drawn inside the boot to prevent sagging or slipping thereof and to assure a tight sealing of the boot to the workpiece. This is accomplished by connecting a vacuum pump (not shown) to suction hose 20 which is attached to the masking boot so as to be in communication with the interior of the masking boot. In order to assure that a good vacuum seal extends over the entire inner surface of the boot a layer of burlap 22 or some other suitable fibrous material is disposed between the masking boot and the workpiece. If desired the layer of burlap can be omitted and instead the inner surface 24 of the masking boot can be roughened, as illustrated in FIG. 3, to assure a complete vacuum within the boot. A suitable masking material 26 is applied to the sealed edges of the masking boot and then trimmed, with a template for example, to expose the exact surface area of the workpiece to be milled. In some instances it may not be necessary or desirable to apply a masking material and if this be the case then the plastic tape can be trimmed to expose the precise area of the workpiece to be milled. After the masking operation is completed the workpiece and masking boot are immersed in a suitable etching solution where the milling occurs.

This completes the description of the invention; however, there will be many changes and modifications thereto which can be made without departing from the spirit and scope of the invention as defined by the appended claims.

What is claimed is:

1. A device for use on a workpiece to be immersed in an etching solution comprising:
   (a) a masking boot composed entirely of a flexible, impervious, rubber material which encloses the entire workpiece except for a surface area slightly larger than that to be etched;
   (b) said masking boot having a continuous edge portion that defines an opening in said masking boot which exposes the surface area of the workpiece to be etched;
   (c) tape means hermetically sealing the continuous edge of said masking boot to the workpiece and masking the workpiece so that only the precise area to be etched is left exposed;
(d) means for evacuating air entrapped between said masking boot and said workpiece to provide a vacuum seal therebetween; and
(e) means comprising a fibrous material disposed between said masking boot and said workpiece to assure a substantially complete evacuation of the air entrapped between the masking boot and the workpiece.

2. A device for use on a workpiece to be immersed in an etching solution comprising:
(a) a masking boot composed entirely of flexible impervious material which encloses the entire workpiece except for a surface area slightly larger than that to be etched;
(b) said masking boot having a continous edge portion that defines an opening in said masking boot which exposes the surface area of the workpiece to be etched;
(c) tape means hermetically sealing the continuous edge of said masking boot to the workpiece and masking the workpiece so that only the precise area to be etched is left exposed;
(d) means for evacuating air entrapped between said masking boot and said workpiece to provide a vacuum seal therebetween; and
(e) means comprising a roughened inner surface of the flexible material disposed between said masking boot and said workpiece to assure a substantially complete evacuation of the air entrapped between the masking boot and the workpiece.

References Cited
UNITED STATES PATENTS 2,820,312   1/1958   Coontz _____ 156—16

JACOB H. STEINBERG, *Primary Examiner.*